United States Patent
Sugitani et al.

(10) Patent No.: US 6,272,403 B2
(45) Date of Patent: *Aug. 7, 2001

(54) REVERSE DETERMINATION METHOD OF VEHICLE AND VEHICLE CONTROL APPARATUS

(75) Inventors: Nobuyoshi Sugitani, Susono; Hiroshi Kawaguchi, Mishima, both of (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,893

(22) Filed: Sep. 29, 1999

(30) Foreign Application Priority Data

Nov. 27, 1998 (JP) .................................................. 10-337897

(51) Int. Cl.⁷ ............................................................ B60T 8/32
(52) U.S. Cl. ................................................... 701/1; 701/41
(58) Field of Search .......................... 701/1, 41; 180/443, 180/446

(56) References Cited

U.S. PATENT DOCUMENTS

| 4,679,808 | 7/1987 | Ito et al. | 280/91 |
| 5,436,831 | 7/1995 | Erhardt et al. | 701/1 |
| 5,640,324 | * 6/1997 | Inagaki | 701/70 |
| 5,684,699 | * 11/1997 | Sugiyama | 701/41 |
| 5,686,662 | * 11/1997 | Tracht et al. | 73/121 |
| 5,694,321 | * 12/1997 | Eckert et al. | 701/91 |
| 5,710,704 | * 1/1998 | Graber | 701/82 |
| 5,734,570 | * 3/1998 | Arlandis | 701/42 |

FOREIGN PATENT DOCUMENTS

| 36 08 420 A-1 | 9/1986 | (DE) . |
| 6-167508 | 6/1994 | (JP) . |
| 7-117645 | 5/1995 | (JP) . |
| 9-287962 | 11/1997 | (JP) . |

* cited by examiner

*Primary Examiner*—Michael J. Zanelli
*Assistant Examiner*—Eric M Gibson
(74) *Attorney, Agent, or Firm*—Oliff & Berridge, PLC (57) ABSTRACT

The present invention permits the status of reverse running of a vehicle to be detected accurately, because whether the vehicle is in reverse running or not is determined based on a relation between a direction of lateral acceleration and a direction of yaw rate.

5 Claims, 7 Drawing Sheets

Fig.1A

FORWARD MOTION

Fig.1B

BACKWARD MOTION

Fig.2

| | STEERING DIRECTION | YAW RATE | LATERAL ACCELERATION |
|---|---|---|---|
| FORWARD MOTION | RIGHT | + | + |
| | LEFT | − | − |
| BACKWARD MOTION | RIGHT | − | + |
| | LEFT | + | − |

REVERSE DETERMINATION METHOD OF VEHICLE AND VEHICLE CONTROL APPARATUS

BACKGROUND OF THE INVENTION

1. Field of the Invention

The present invention relates to a reverse determination method of vehicle for determining whether a vehicle is in reverse running, and a vehicle control apparatus making use of this method.

2. Related Background Art

There have been suggestions heretofore about approaches to determining whether the vehicle is in reverse running, based on behavior of the vehicle, in addition to approaches to determining whether the vehicle is in reverse running, based on the shift position of the shift lever. For example, Japanese Patent Application Laid-Open No. Hei6(1994)-167508 suggests a way of determining whether the vehicle is in reverse running, based on a yaw rate estimated from a steering-wheel angle and a vehicle speed and a real yaw rate detected actually.

SUMMARY OF THE INVENTION

Since the real yaw rate detected actually has a phase lag behind the steering-wheel angle detected, i.e., behind actual steering operation, there are cases wherein a direction of the estimated yaw rate and a direction of the real yaw rate are reverse in the initial stage of steering. In such cases, there was the possibility that the reverse running of vehicle could be misjudged.

An object of the present invention is, therefore, to provide a reverse determination method of vehicle that permits the reverse running of vehicle to be determined more accurately, and a vehicle control apparatus making use of this method.

A reverse determination method of vehicle according to the present invention is a reverse determination method of vehicle for determining whether a vehicle is in reverse running, comprising a step of detecting a lateral acceleration and a yaw rate acting on the vehicle and a step of determining whether the vehicle is in reverse running, based on a direction of the lateral acceleration acting on the vehicle and a direction of the yaw rate also acting on the vehicle.

Let us consider two cases here; the vehicle is moving forward or backward while the steering wheel is turned by a predetermined steering-wheel angle from the neutral position. Under such situations, the lateral acceleration acts in the same direction on the vehicle in the forward motion and in the backward motion, but the yaw rate acts in opposite directions on the vehicle in the forward motion and in the backward motion. It is thus possible to determine whether the vehicle is in reverse running, based on the directions of the lateral acceleration and the yaw rate acting on the vehicle.

A vehicle control apparatus of the present invention comprises lateral acceleration detecting means for detecting a lateral acceleration acting on a vehicle, yaw rate detecting means for detecting a yaw rate acting on the vehicle, and determination means for determining whether the vehicle is in reverse running, based on directions of the lateral acceleration and the yaw rate acting on the vehicle, wherein a predetermined vehicle control is carried out based on the lateral acceleration and the yaw rate detected, and based on a running direction of the vehicle determined.

The lateral acceleration acts in the same direction on the vehicle in the forward motion and in the backward motion, but the yaw rate acts in opposite directions on the vehicle in the forward motion and in the backward motion, as described above. Therefore, the determination means is arranged to determine whether the vehicle is in reverse running, based on the directions of the lateral acceleration and the yaw rate acting on the vehicle.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the present invention will be described with reference to the accompanying drawings.

Figure 1A:
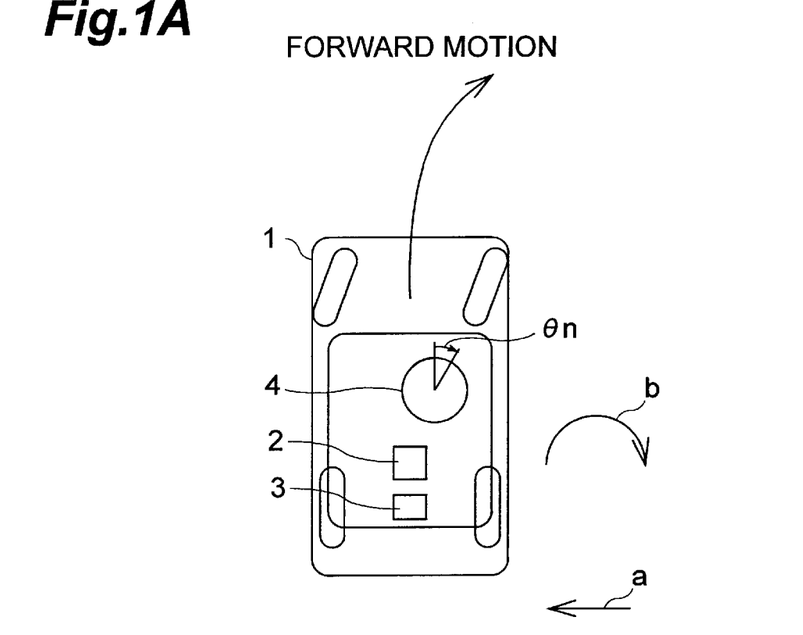
FIG. 1A is an explanatory diagram to show the directions of the yaw rate and the lateral acceleration acting on the vehicle where the vehicle is moving forward while the steering wheel is turned by a steering-wheel angle θn from the neutral position to the right.
Figure 1B:
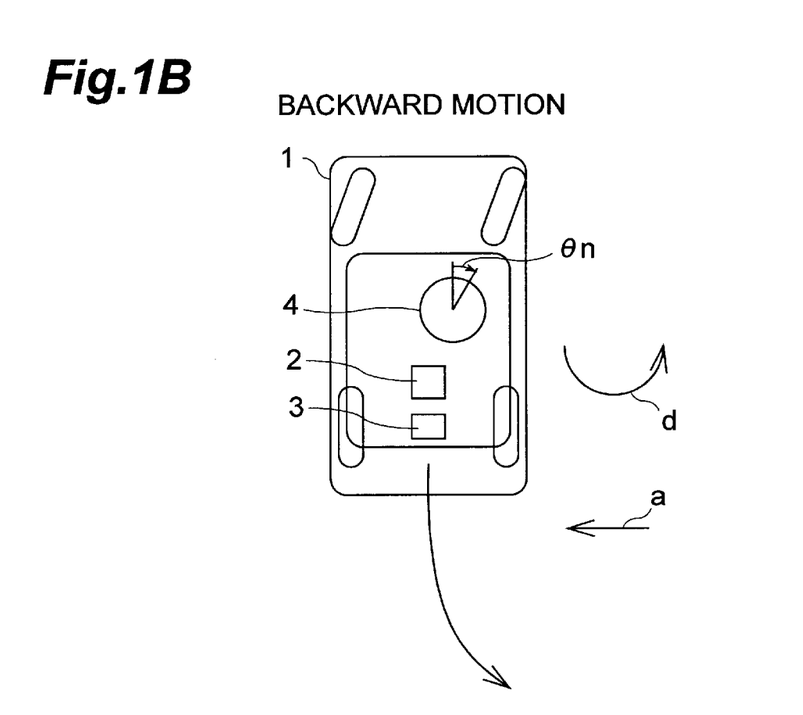
FIG. 1B is an explanatory diagram to show the directions of the yaw rate and the lateral acceleration acting on the vehicle where the vehicle is moving backward while the steering wheel is turned by the steering-wheel angle θn from the neutral position to the right.

First, an embodiment of the determination method for determining whether the vehicle is in reverse running according to the present invention will be described. In FIG. 1A, the vehicle 1 is equipped with a yaw rate sensor 2 and a lateral acceleration sensor 3. FIG. 1A shows a state in which the steering wheel 4 is turned by the steering angle θn from the neutral position to the right. Supposing that the vehicle 1 moves forward from this state, the lateral acceleration sensor 3 detects the lateral acceleration acting on the vehicle 1 in the direction indicated by the arrow a, and the yaw rate sensor 2 detects the yaw rate acting on the vehicle 1 in the direction indicated by the arrow b. In contrast with it, when the vehicle 1 is reversed, similarly, in the state in which the steering wheel 4 is turned by the steering angle θn from the neutral position to the right, as illustrated in FIG. 1B, the lateral acceleration sensor 3 detects the lateral acceleration acting on the vehicle 1 in the direction indicated by the arrow a, and the yaw rate sensor 2 detects the yaw rate acting on the vehicle 1 in the direction indicated by arrow d.

If the vehicle moves forward with the steering wheel 4 being turned from the neutral position to the left, which is not illustrated, the sensors will detect the lateral acceleration and the yaw rate acting in the opposite directions to the arrows a, b illustrated in FIG. 1A. On the other hand, if the vehicle is reversed with the steering wheel 4 being turned from the neutral position to the left, the sensors will detect the lateral acceleration and yaw rate acting in the opposite directions to the arrows a, d illustrated in FIG. 1B.

Figure 2:
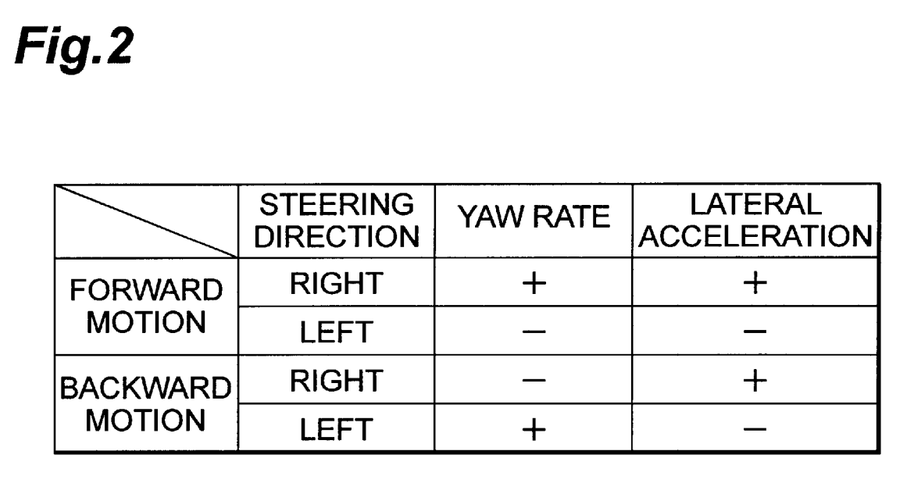
FIG. 2 is a map to show acting directions of the yaw rate and the lateral acceleration against steering positions in the forward motion and in the backward motion of the vehicle. In the map the sign "+" indicates the directions of arrows a, b illustrated in FIG. 1A.

Such relations are summarized in the map of FIG. 2. In this map, the sign "+" indicates the directions of the arrows a, b illustrated in FIG. 1A. Namely, the sign "+" is given to lateral accelerations acting on the vehicle 1 in the direction of the arrow a (FIG. 1A), and the sign "−" to lateral accelerations acting on the vehicle in the opposite direction to the direction of the arrow a. Further, the sign "+" is given to yaw rates acting on the vehicle 1 in the direction of the arrow b (FIG. 1A), and the sign "−" to yaw rates acting on the vehicle 1 in the opposite direction to the direction of the arrow d (FIG. 1B).

This map can be used for accurately determining whether the vehicle is in the forward motion or in the backward motion, based on the sign relations of the yaw rate and the lateral acceleration detected. In this case, for example, the determination can also be made as follows; comparison is made between signs of the lateral acceleration and the yaw rate detected and determination is made so that the vehicle is in forward running with the same signs, but the vehicle is in reverse running with the opposite signs.

Now let us explain an example of application of the reverse determination method of vehicle described above to an actual vehicle control.

A first example is an application of the reverse determination method of vehicle described above to a reaction force control in a steering control mechanism. This steering control mechanism has not a mechanical link between a steering input mechanism and a steering output mechanism.

Figure 3:
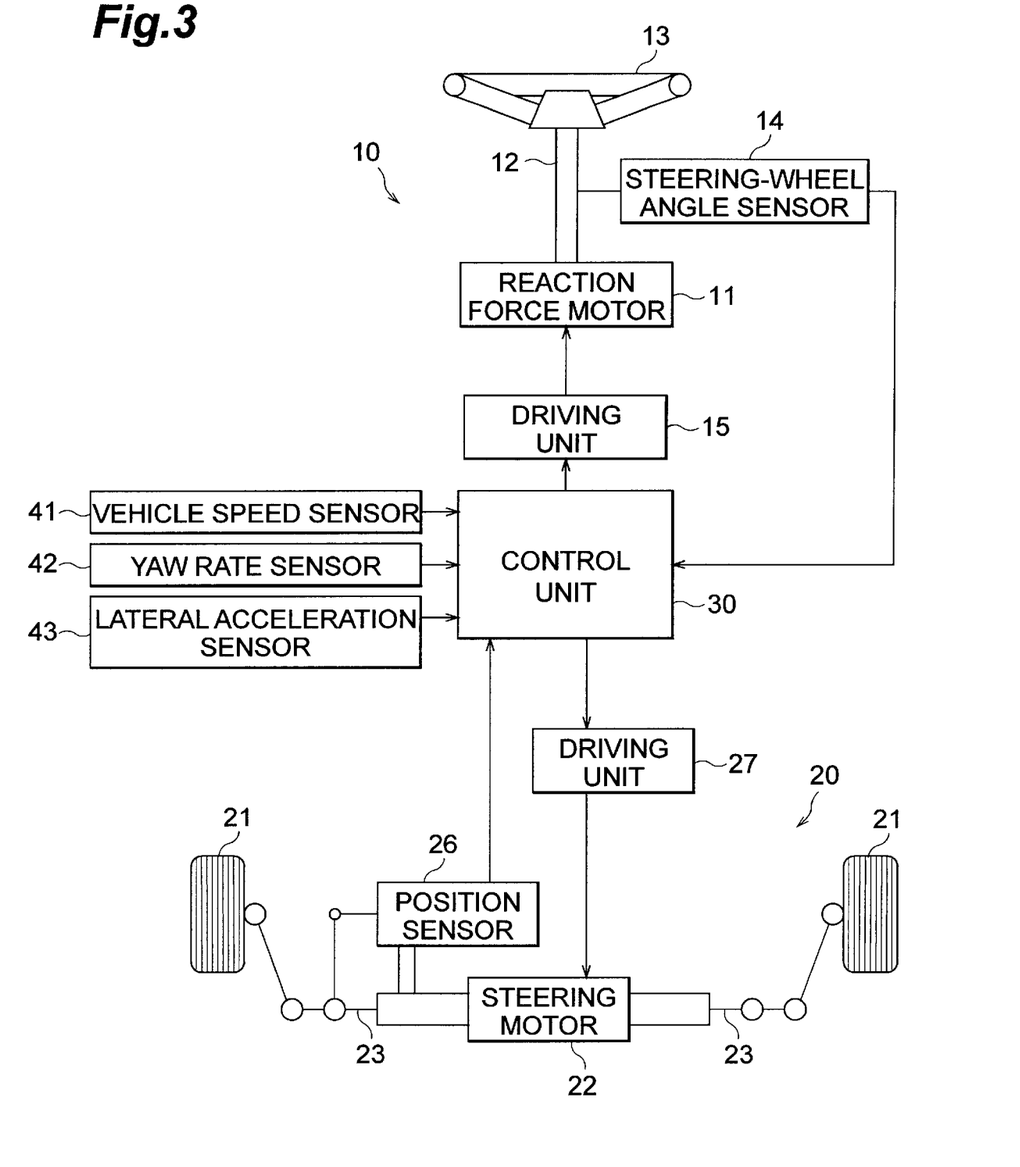
FIG. 3 is a block diagram to show the structure of a steering control mechanism.

FIG. 3 schematically shows the structure of the steering control mechanism. This steering control mechanism is comprised of a steering input mechanism 10 handled by a driver, a steering output mechanism 20 which changes the steer angles of steered wheels 21, and a control unit 30 for electrically carrying out an interlocking control between the steering input mechanism 10 and steering output mechanism 20.

The steering input mechanism 10 is provided with a reaction force motor 11 for imposing a steering reaction force, and a steering wheel 13 is coupled via a steering shaft 12 to an output shaft of the reaction force motor 11. A driving unit 15 drives the reaction force motor 11 according to a controlled variable Th supplied from the control unit 30. The steering output mechanism 20 is provided with a steering motor 22 to change the steer angles of the wheels 21, and is structured to move a rack shaft 23 along its axial direction by the steering motor 22, so as to change the steer angles of the wheels 21 linked thereto on the both sides. A driving unit 27 drives the steering motor 22 according to a controlled variable Tw supplied from the control unit 30. The control unit 30 receives detected results from vehicle speed sensor 41, yaw rate sensor 42, and lateral acceleration sensor 43, in addition to the detected results from a steering-wheel angle sensor 14 for detecting a steering-wheel angle and from a position sensor 26 for detecting a stroke position of the rack shaft 23. The control unit 30 sets the controlled variable Tw for the steering motor 22 and the controlled variable Th for the reaction force motor 11, based on the detection results of the respective sensors described above.

First, a setting operation of the controlled variable Tw for the steering motor 22 will be described briefly. The control unit 30 sets a target stroke position Xt of the rack shaft 23, based on steering-wheel angle θ and vehicle speed V, and also sets the controlled variable Tw according to Eq. (1) below, using the thus set target stroke position Xt and the current stroke position Xr. In Eq. (1), C1, C2, and C3 designate gain coefficients representing respective gains of their pertinent operation terms.

$$Tw = C1 \cdot (Xt - Xr) + C2 \cdot d(Xt - Xr)/dt + C3 \cdot \int (Xt - Xr) dt \quad (1)$$

The controlled variable Th for the reaction force motor 11 is determined as the sum of a controlled variable Tmap(θ,V) and a controlled variable Ky·γ. The controlled variable Tmap(θ,V) is set according to the steering-wheel angle θ and the vehicle speed V. And the controlled variable Ky·γ is proportional to the detected yaw rate γ (where "Ky" is a proportional coefficient).

By setting the controlled variable Th in this way, the steering reaction force can be made to reflect the status of the vehicle. The aforementioned reverse determination of vehicle is adopted in this setting of the controlled variable Th.

Figure 4:
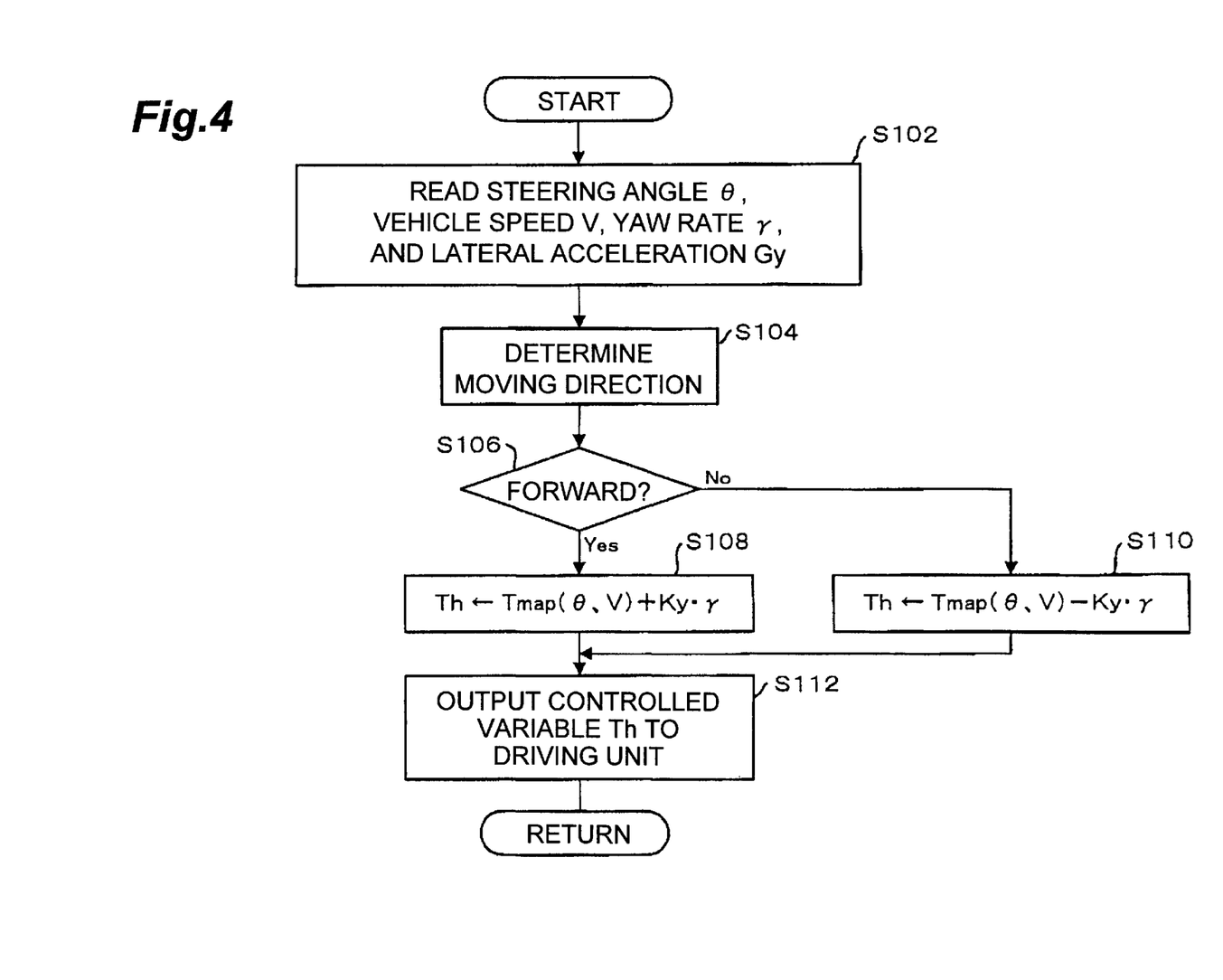
FIG. 4 is a flowchart to show a control process for a reaction force motor.

Here the flowchart of FIG. 4 shows an example of the control operation for the reaction force motor 11. First, the control unit 30 proceeds to step (hereinafter referred to as "S") 102 to read values of the steering-wheel angle θ, vehicle speed V, yaw rate γ, and lateral acceleration Gy detected. In next S104, the control unit 30 determines the moving direction of the vehicle 1 from the map of FIG. 2, based on the acting directions (plus or minus sign) of the yaw rate γ and lateral acceleration Gy. In next S106, the control unit 30 determines whether the moving direction of the vehicle 1 is forward. If the moving direction of the vehicle is forward (if "Yes" in S106), the control unit 30 proceeds to S108 to set the controlled variable Th for the reaction force motor 11, as the sum of the controlled variable Tmap(θ,V) and the controlled variable Ky·γ, as described in Eq. (2) below. On the other hand, if the moving direction of the vehicle 1 is backward (if "No" in S106), the control unit 30 proceeds to S110 to set the controlled variable Th for the reaction force motor 11, based on Eq. (3) below having the second term with the opposite sign on the right side to that in Eq. (2), because the direction of the yaw rate γ is opposite.

$$Th = T\text{map}(\theta, V) + Ky \cdot \gamma \quad (2)$$

$$Th = T\text{map}(\theta, V) - Ky \cdot \gamma \quad (3)$$

Then, in next S112, the control unit 30 outputs the controlled variable Th set in S108 or in S110 to the driving unit 15, whereupon the driving unit 15 drives the reaction force motor 11 according to the controlled variable Th.

When the vehicle is judged in the reverse as described above, the suitable reaction force control can also be carried out continuously in the reverse motion of the vehicle by reversing the sign of the controlled variable (operation term) based on the yaw rate. On the other hand, if the controlled variable based on the as-detected yaw rate were set under the circumstances where the vehicle is moving back, the control unit would set the controlled variable in the opposite direction to that expected to be set. In this embodiment, therefore, the controlled variable is correctly determined by reversing the sign of the controlled variable based on the yaw rate by reversing means, where the determination means for determining whether the vehicle is in reverse running determines that the vehicle is in reverse running.

The next example is an application of the reverse determination method described previously to a power steering mechanism for generating an assist force of steering. In this case, the steering reaction force increases with decrease of the assist force, whereas the steering reaction force decreases with increase of the assist force.

Figure 5:
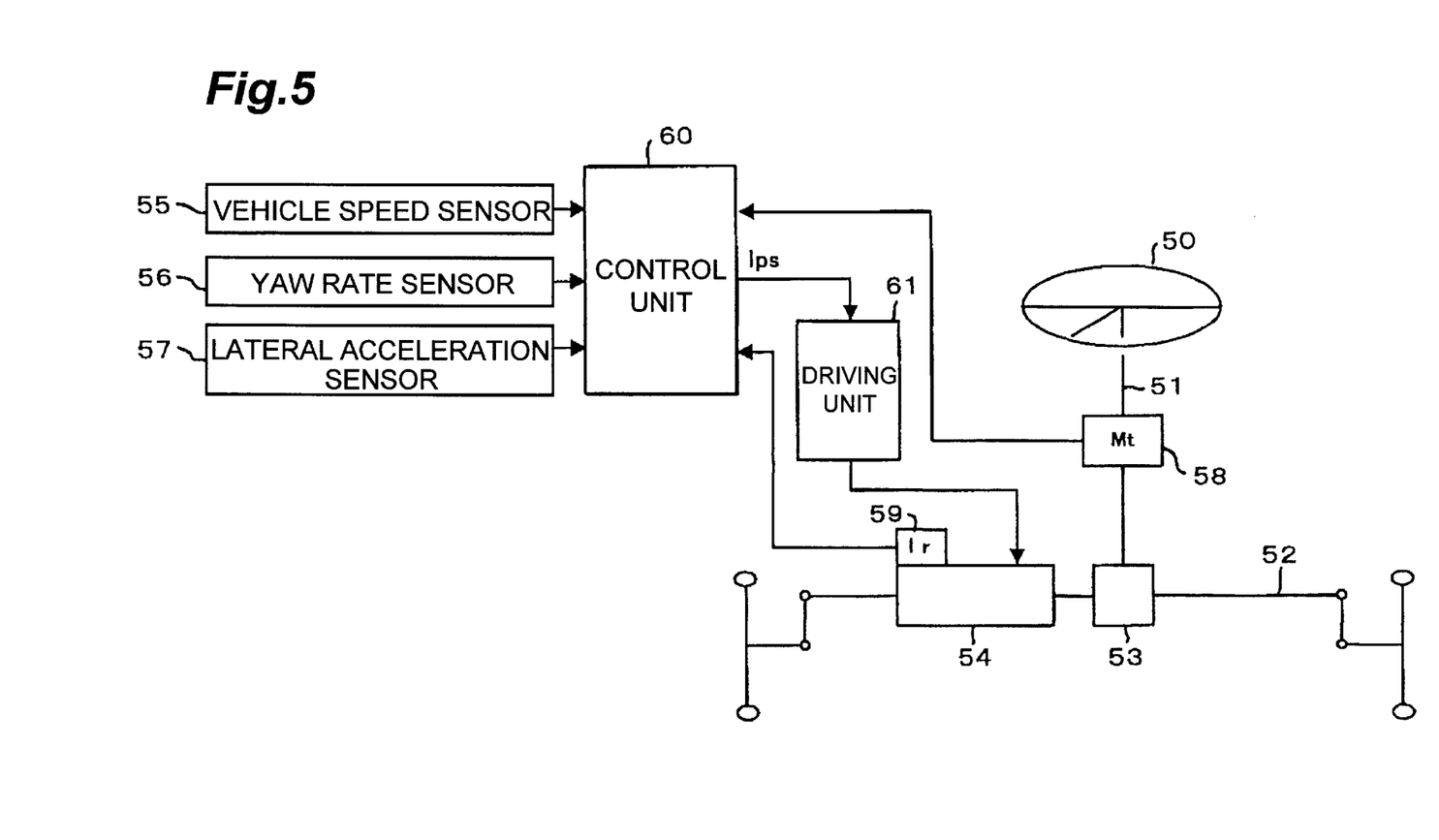
FIG. 5 is a block diagram to show a steering control mechanism equipped with a power steering mechanism.

FIG. 5 schematically shows an example of a steering control mechanism equipped with the power steering mechanism. A steering shaft 51 and a steering rod 52 are mechanically linked via a gear box 53, and an assist force of steering is given by driving force of assist motor 54. The control unit 60 receives detection results from a torque sensor 58 for detecting a steering torque Mt and a current sensor 59 for detecting a electric current Ir fed to the assist motor 54, in addition to the detected results from the vehicle speed sensor 55, yaw rate sensor 56, and lateral acceleration sensor 57. Then the control unit 60 sets a target current Ips for driving the assist motor 54, based on these detection results, and the driving unit 61 controls the driving current so as to feed the target current Ips to the assist motor 54.

Figure 6:
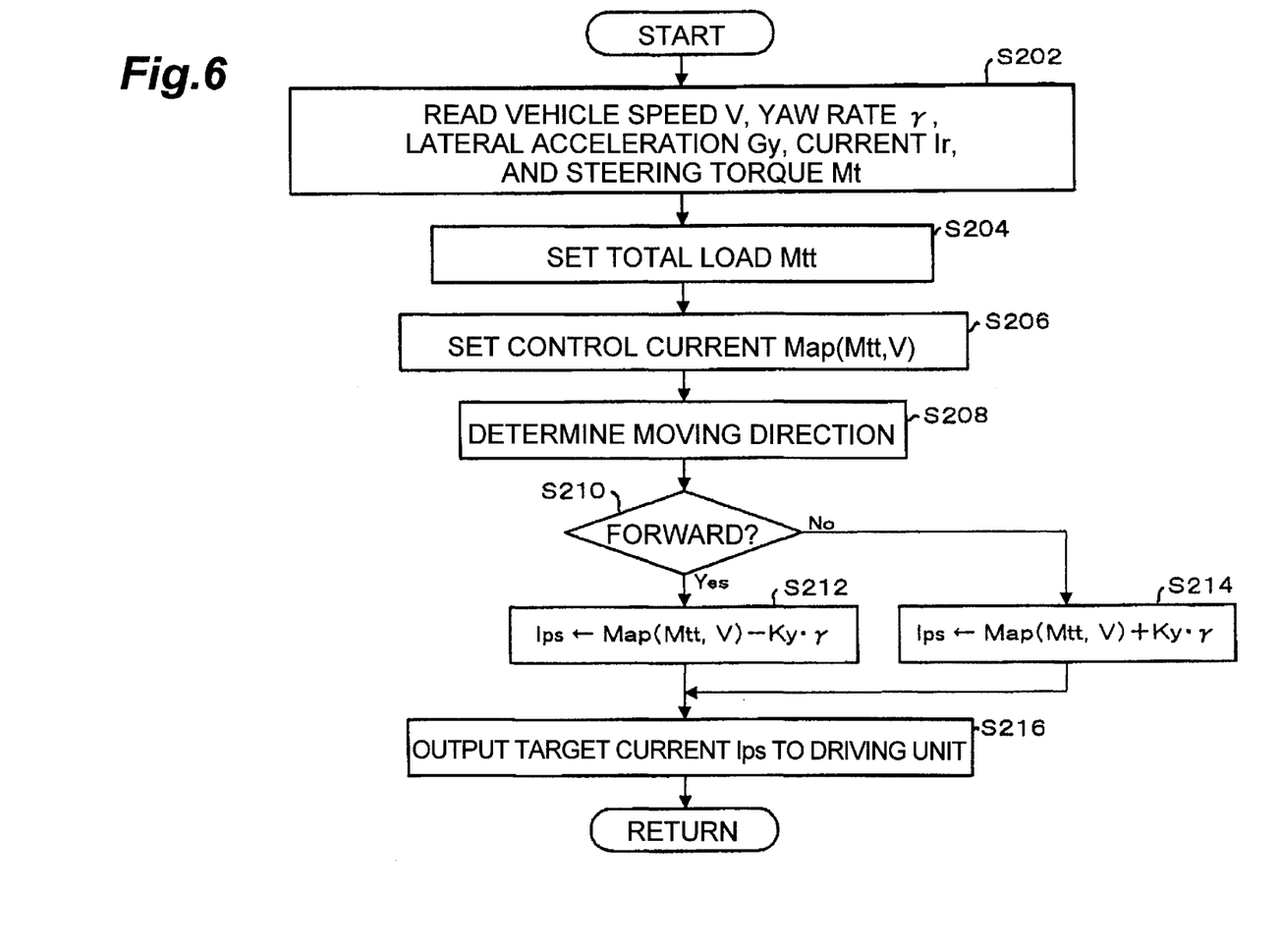
FIG. 6 is a flowchart to show a control process for an assist motor.

The operation executed in the control unit 60 will be described along the flowchart of FIG. 6. First, the control unit goes to S202 to read values of the vehicle speed V, yaw rate γ, lateral acceleration Gy, current Ir, and steering torque Mt detected by the respective sensors. In next S204, the control unit 60 calculates a total steering load acting on the steering wheel 50 according to Eq. (4) below and sets the result thereof as a total load (total steering load) Mtt. In Eq. (4), "Kps" represents a coefficient to define the effect of the current Ir fed to the assist motor 54 on the steering torque Mt.

$$Mtt = Kps \cdot Ir + Mt \quad (4)$$

Figure 7:
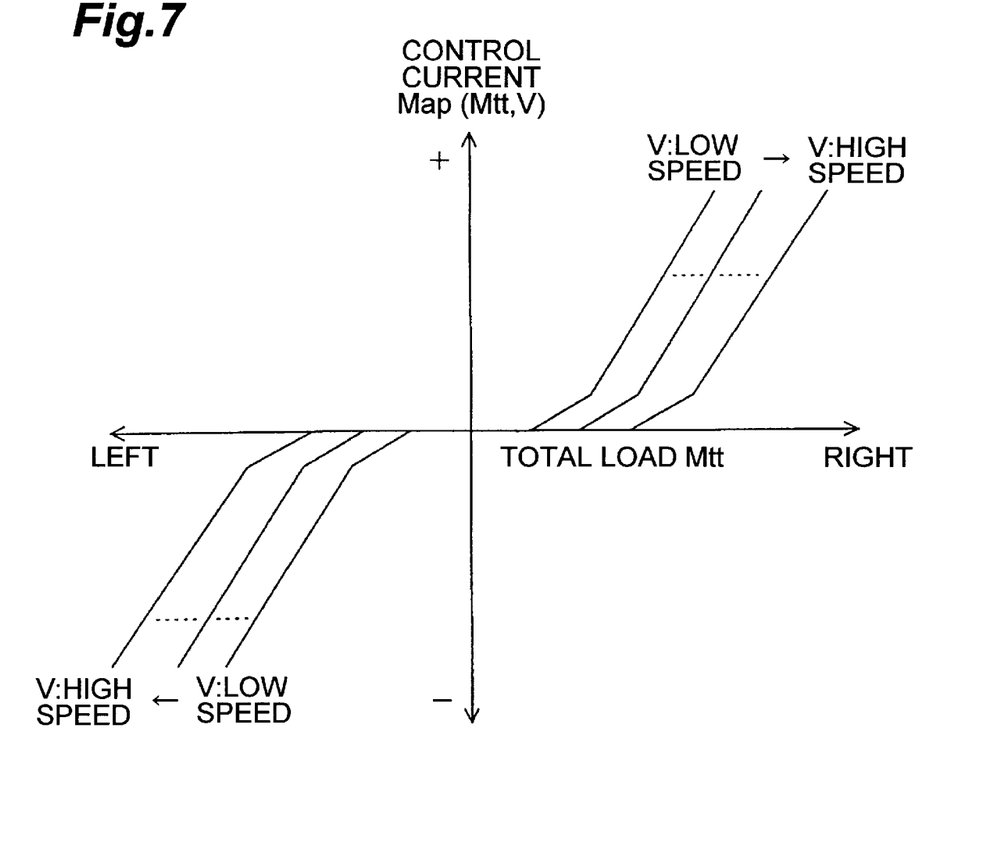
FIG. 7 is a map to define the relation of control current Map(Mtt,V) against total load Mtt and vehicle speed V.

In next S206, the control unit 60 sets a control current Map(Mtt,V) for the assist motor 54, based on the total steering load Mtt set in S204 and the vehicle speed V. In this case, the map is preliminarily created as to the relation of the control current Map(Mtt,V) against the total steering load Mtt and vehicle speed V, for example, as illustrated in FIG. 7. And the map is searched according to the total load Mtt and the vehicle speed V to find out a corresponding control current Map(Mtt,V).

In next S208, the control unit 60 determines the moving direction of the vehicle 1 from the map of FIG. 2, similarly as before, based on the acting directions (plus or minus sign) of the yaw rate γ and lateral acceleration Gy read in S202. In next S210, the control unit 60 determines whether the moving direction of the vehicle 1 determined in S208 is forward. If the moving direction of the vehicle is forward (if "Yes" in S210), the control unit 60 proceeds to S212 to set the target current Ips to be fed to the assist motor 54, based on the control current Map(Mtt,V) set in S206 and the controlled variable Ky·γ based on the yaw rate γ, as indicated by Eq. (5) below. In this case, since the steering reaction force is to be increased with increase in the yaw rate γ, the assist force by the assist motor 54 is to be lowered. Therefore, the sign of the second term on the right side is "−". On the other hand, if the moving direction of the vehicle 1 is backward (if "No" in S210), the control unit 60 proceeds to S214 to set the target current Ips to be fed to the assist motor 54, based on Eq. (6) below having the second term with the opposite sign on the right side to that in Eq. (5), because the direction of the yaw rate γ is opposite.

$$Ips = \text{Map}(Mtt, V) - Ky \cdot \gamma \quad (5)$$

$$Ips = \text{Map}(Mtt, V) + Ky \cdot \gamma \quad (6)$$

In next S216, the control unit 60 outputs the target current Ips set in S212 or in S214 to the driving unit 61, and the driving unit 61 controls the current so as to feed the target current Ips to the assist motor 54.

As described above, the reverse determination method of vehicle described previously can also be applied to the steering reaction control in the electric power steering mechanism. Namely, when the vehicle is judged in the reverse, the suitable reaction force control can also be carried out continuously in the reverse motion of the vehicle by reversing the sign of the controlled variable (operation term) based on the yaw rate γ. On the other hand, if the controlled variable based on the as-detected yaw rate were set under the circumstances where the vehicle is moving back, the control unit would set the controlled variable in the opposite direction to that expected to be set. In the present embodiment, therefore, the controlled variable is correctly determined by reversing the sign of the controlled variable based on the yaw rate by the reversing means, where the determining means for determining whether the vehicle is in reverse running determines that the vehicle is in reverse.

Each of the embodiments described above showed the example wherein the reverse determination method of vehicle was applied to the control of steering reaction force, but it is also possible to apply the reverse determination method to other vehicle controls, of course.

Further, each embodiment showed the example of the operation in which the sign of the controlled variable (operation term) based on the yaw rate was reversed when it was determined that the vehicle was in reverse running, but it can also be contemplated that when it is determined that the vehicle is in reverse running, an operation to reverse a sign of a detected value of the yaw rate is first carried out and thereafter a sign-reversed signal is supplied to the control unit.

As described above, the reverse determination method of vehicle according to the present invention includes judging the reverse running of the vehicle, based on the directions of the lateral acceleration and the yaw rate acting on the vehicle, so that the reverse status of the vehicle can be determined from the actual vehicle motion, independent of the shift position of the shift lever and the driving operation of the driver; therefore, the status of reverse running of the vehicle can be determined more accurately without misjudgment.

The vehicle control apparatus according to the present invention is provided with the lateral acceleration detecting means for detecting the lateral acceleration acting on the vehicle, the yaw rate detecting means for detecting the yaw rate acting on the vehicle, and the determination means for determining whether the vehicle is in reverse running, based on the directions of the lateral acceleration and the yaw rate acting on the vehicle, and is arranged so that the determination means determines whether the vehicle is in reverse running, based on the lateral acceleration and the yaw rate detected; therefore, it can determine the status of reverse running of vehicle accurately.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A reverse determination method of a vehicle, comprising a step of detecting lateral acceleration and a yaw rate acting on the vehicle and a step of determining whether the vehicle is in reverse running, based on a direction of the lateral acceleration acting on the vehicle and a direction of the yaw rate action thereon, and a step of carrying out a predetermined reaction force control based on the lateral acceleration and yaw rate detected and based on a reverse running direction of the vehicle determined.

2. A vehicle control apparatus comprising:

lateral acceleration detecting means for detecting a lateral acceleration acting on a vehicle;

yaw rate detecting means for detecting a yaw rate acting on the vehicle;

determination means for determining whether the vehicle is in reverse running, based on a direction of the lateral acceleration acting on the vehicle and a direction of the yaw rate acting thereon; and wherein a predetermined reaction force control is carried out based on the lateral acceleration and yaw rate detected and based on a reverse running direction of the vehicle determined.

3. The vehicle control apparatus according to claim 2, further comprising reversing means for reversing a sign of a controlled variable based on the yaw rate when said determination means determines that the vehicle is in reverse running.

4. The vehicle control apparatus according to claim 2, said vehicle having a steering input mechanism and a steering output mechanism which are separated mechanically from each other, wherein a vehicle control for controlling a steering reaction force imposed on the steering input mechanism is carried out based on the lateral acceleration and yaw rate detected and based on the running direction of the vehicle determined.

5. The vehicle control apparatus according to claim 2, said vehicle having a power steering mechanism for generating an assist force of steering, wherein a vehicle control for controlling the assist force is carried out based on the lateral acceleration and yaw rate detected and based on the running direction of the vehicle determined.

* * * * *